May 21, 1940. W. J. KINDERMAN 2,201,542
GAUGE GLASS WITH GASKET AND GASKET SEAT
Filed March 26, 1937 5 Sheets-Sheet 1

Witnesses:
Inventor
Walter J. Kinderman
Attorneys.

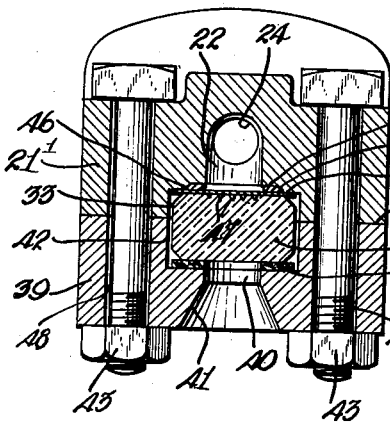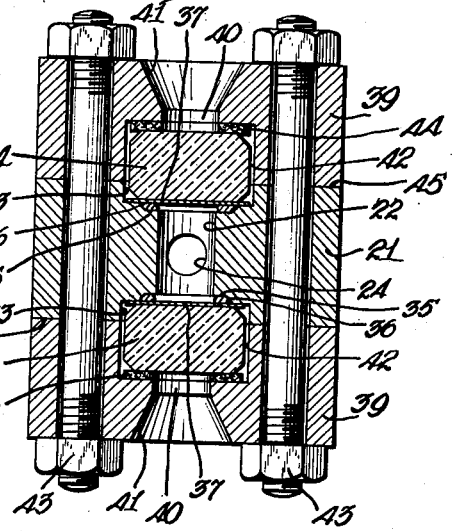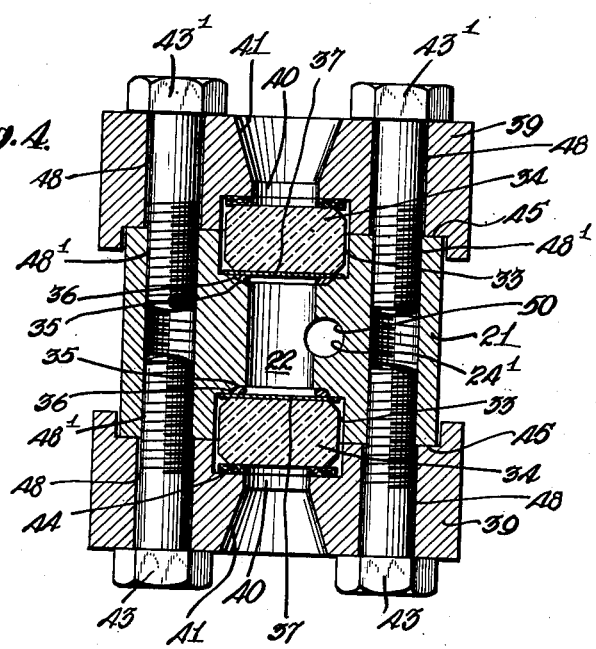

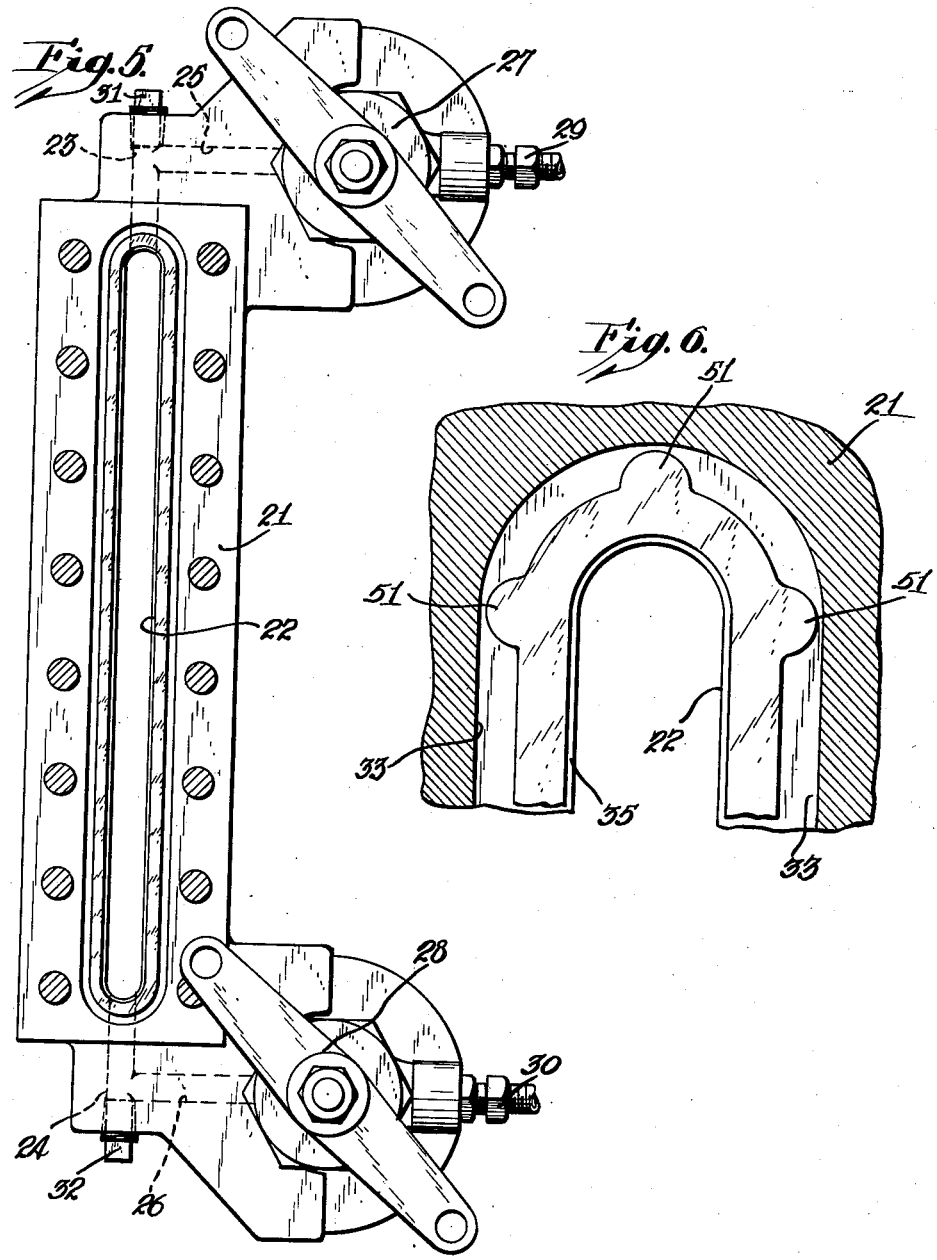

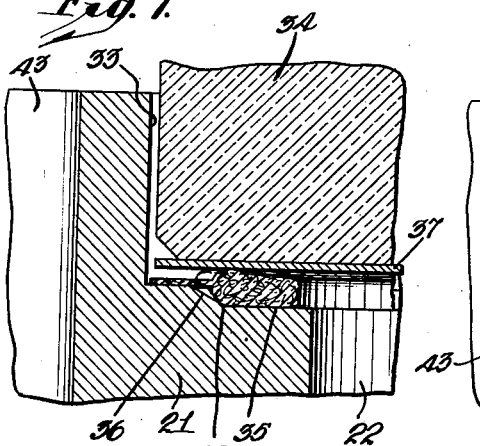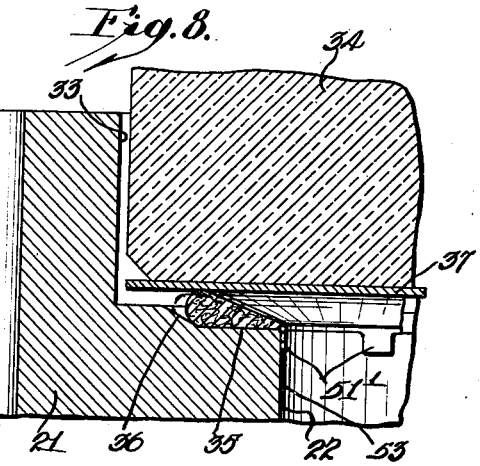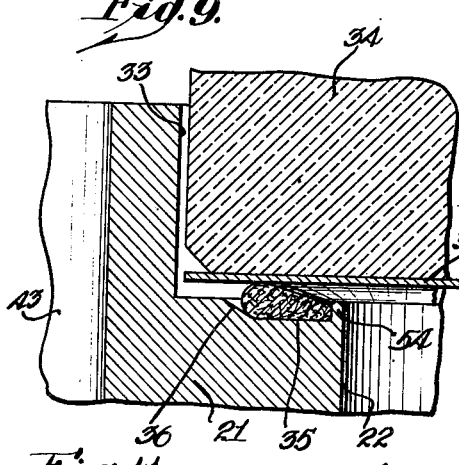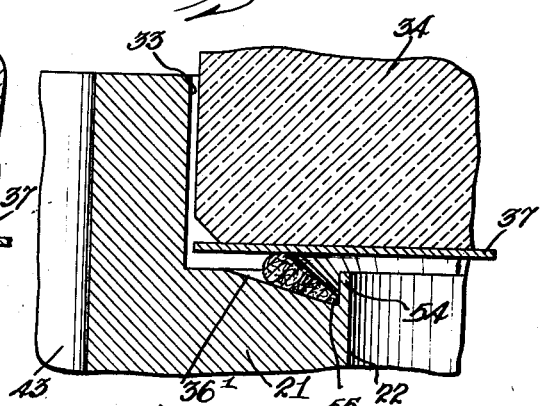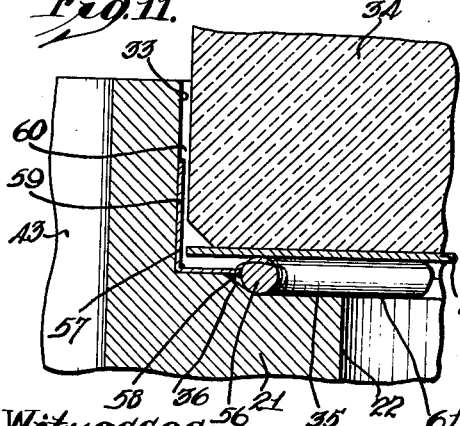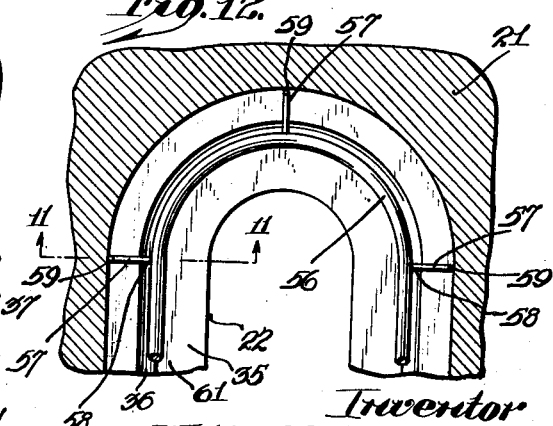

Patented May 21, 1940

2,201,542

UNITED STATES PATENT OFFICE 2,201,542

GAUGE GLASS WITH GASKET AND GASKET SEAT

Walter J. Kinderman, Philadelphia, Pa., assignor to Yarnall-Waring Company, Philadelphia, Pa., a corporation of Pennsylvania Application March 26, 1937, Serial No. 133,126

7 Claims. (Cl. 73—330)

The present invention relates to water level gauges of the type having one or more flat glass plates over a longitudinal slot or slots into the side of a water column within a tubular metal body. The flat glass plates fit against seats along the slots and are held to place by metal cover plates. The plates are protected from the metal of the column and from the metal of the cover by gaskets or cushions.

A purpose of the invention is outwardly to constrict the gasket space between the glass and the metal body of a gauge of the type indicated.

A further purpose is to slope the seat between the body of a water gauge column and a flat glass outwardly toward the glass and to seat a gasket within the outwardly converging walls of the space about the longitudinal slot of the column. The gasket is initially somewhat compressed to expand it outwardly into the progressively constricting space between the glass and seat and so that the outward pressure within the column presses the gasket into the constriction. The extent of compression of the gasket is preferably limited by the limiting movement of the cover plate and body of the gauge.

A further purpose is to provide an outwardly progressively constricted space between a metal body of a water level gauge and a flat glass closing a slot to the column, with a gasket having fibers generally longitudinal of the seat whereby the gasket is free simultaneously to stretch longitudinally and to move outwardly by reason of the fluid pressure into the more constricted portions of the space under the glass, thereby sealing against the glass and the column wall.

A further purpose is to use a molded gasket having fibers preferably longitudinal of the perimeter of the seat and preferably initially of round section and to flatten it by pressing against it a mica-covered flat glass.

A further purpose is to use a continuous metal gasket of round cross section and to compress it beneath a mica-protected glass plate.

A further purpose is tentatively to hold a gasket in position upon a gauge glass seat by tabs outside or inside the gasket periphery.

A further purpose is to provide alternative forms of molded gasket or/and of seats for the gasket for more easy right registry of the gasket with respect to an outwardly sloping seat for a flat glass over the gasket.

Further purposes will appear in the specification and in the claims.

I have elected to show a few only of the different forms of my invention, selecting forms however that are practical and efficient in operation and which well illustrate the principles involved.

Figures 2, 3 and 4 are reduced scale transverse sections of different commercial forms embodying the present invention.

Figure 5 is a front elevation of Figure 3 with the front cover plate and front glass removed.

Figure 6 is a fragmentary vertical section of Figure 1 illustrating the end portion of the seat for the gasket that receives the flat glass and showing a desirable form of gasket in place but taken before the glass has been put in place.

Figure 1:
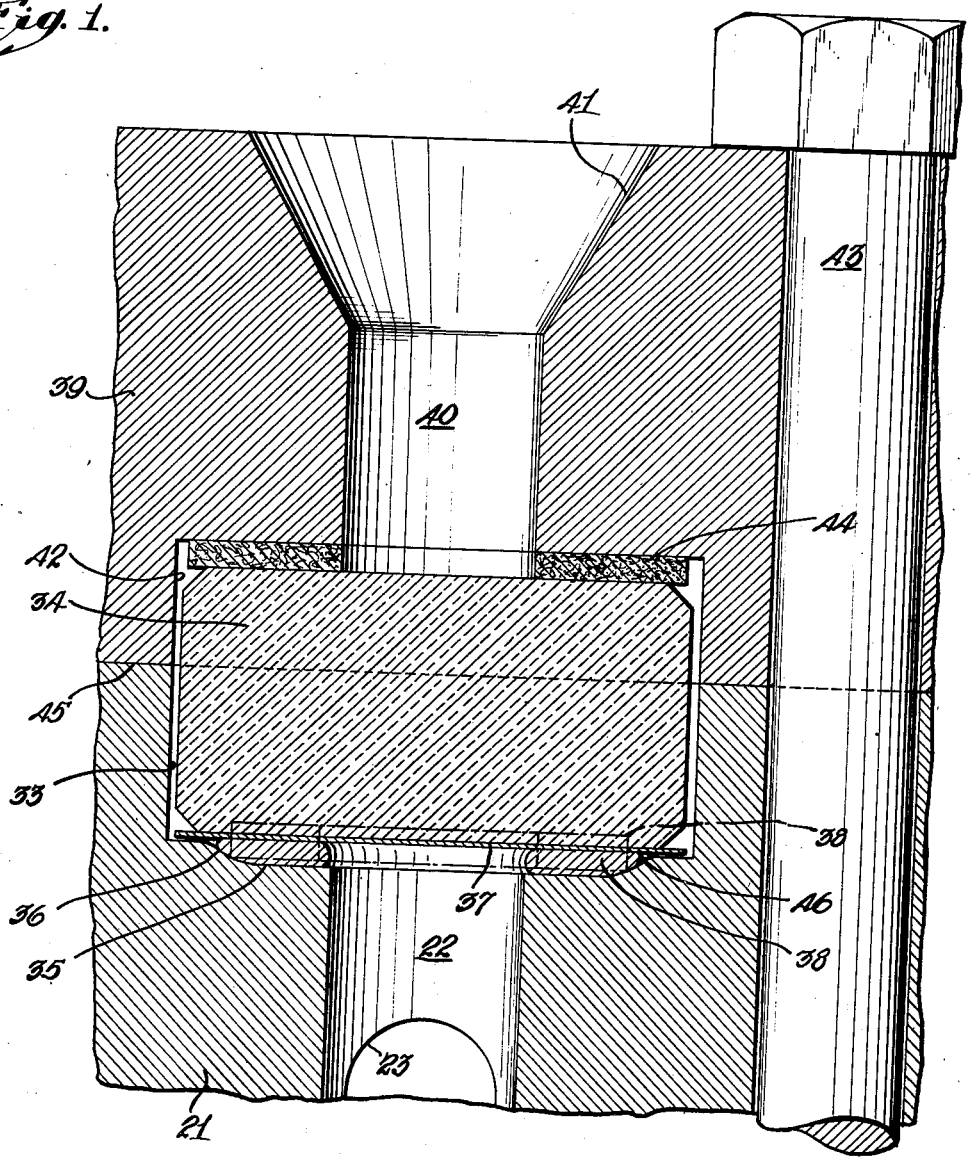
Figure 1 is a broken transverse section through structure embodying a desirable form of the invention and intended in its broader forms to be a conventional showing of any one of the many different types of the gauges adapted to embody the present invention.

Figures 7, 8, 9, 10 and 11 are fragmentary sections of gauge structures embodying somewhat different alternative features of the present invention and showing gaskets in place of respectively different forms. These gaskets are shown as they exist prior to the fastening of the cover plate to place and therefore prior to the compression of the illustrated gaskets. The views illustrate also somewhat different methods of registering the gasket on its seat preparatory to fastening the cover down to the body.

Figure 12 is a fragmentary elevation of the structure of Figure 11 with the glass removed to show the registration of the gasket upon its seat.

Figures 13, 14, 15 and 16 are views corresponding generally to Figures 7 to 11 but showing different forms of gasket and seat.

Like numerals refer to like parts in all figures.

Describing in illustration but not in limitation and referring to the drawings:

The water gauges in question are of the flat glass type in which an open slot, through, or into one side only, of a tubular body is sealed by one or more heavy flat glass plates. Normally the columns thus formed are used with high pressure boilers and hitherto have been subject to frequent breakage of the flat glass from clamping down the cover plate too tightly or unevenly upon the glass.

The present invention secures wedge clamping of the gasket and at the same time protects from uneven and heavy clamping of the glass when putting the cover in place by the combination of two features, the fact that the cover clamps home upon the body before compressing the gasket unduly and the maintenance of uniform placing of the gasket.

The construction shown particularly protects against excessive or uneven pressures upon the glass about the perimeter of the glass by providing contact of the cover with the body not only outside of the line of bolt holes but also inside this line of bolt holes.

Applicant outwardly slopes the seat of the glass-sealing gasket throughout its entire perimetral extension whereby the gasket-receiving space between the body and the flat glass, progressively constricts outwardly.

In clamping down the cover, the glass compresses the gasket somewhat, forcing its section outwardly into the more constricted outer space but limiting "stop" surfaces keep the gasket pressure low. After the cover plate has been clamped home and the gauge has been put in use, the fluid pressure within the column forces the gasket outwardly along the plane of the glass more tightly into the wedge-like constriction space between the seat and glass so to gasket-seal against leakage under the glass progressively better as the pressure within the gauge rises.

Referring to the structure of Figures 3 and 5, a metal tubular body 21 is through-slotted at 22 for a major portion of its length and is bored from opposite ends longitudinally at 23 and 24 into the through-slot 22. It is also bored laterally at 25 and 26 into the bores 23 and 24 to provide connections to valves 27 and 28 for connection at 29 and 30 to the water and steam spaces respectively of a high pressure boiler or the like, not shown.

The valves 27 and 28, permit the gauge to be cut out from connection with the boiler at will. Drain and clean-out plugs 31 and 32 close the open ends of the bores 23 and 24 respectively.

As illustrated, the body, through-slotted at 22, is recessed at 33 about each side of the slot 22 to loosely receive the glass 34 and the bottom of each recess is formed with gasket-seat 35 having an outward slope 36 toward the glass 34 so that the perimetral space between the seat and the glass 34, progressively constricts outwardly at the slope portion 36 of the seat.

In practice each glass plate is protected at its inner face from direct contact with water and steam within the through-slot 22 of the body by a sheet 37 of mica, and preferably the adjoining surfaces of the mica and glass are coated with a film of oil. This improves the clearness of vision through the glass and mica. Throughout the specification and claims the term "glass" may include the mica lining as well as the glass proper.

Each gasket 38 is formed as an endless band of such size as to follow the seat 35 throughout its perimetral length. It is compressed initially by the glass preferably into the outwardly constricted space between the glass and sloping portion 36 of the seat.

Each metal cover 39, is through-slotted at 40 in front of the slot 22 of the body 12, an outward flare 41 of the slot 40 increasing the access of light to and vision into the water column. The cover is recessed at 42 in complementary registry with the recess 33 of the body and is bolted at 43 to the body. The cover lies over the glass 34 but a cushion 44 protects the glass from direct contact with the metal cover.

The oppositely directed recesses 33 and 42 of the body and cover are complementary, with their total depth somewhat less than the sum of the thicknesses of the uncompressed cushion 44, glass 34, mica 37 and uncompressed gasket 38. The difference between the sum of these thicknesses and the sum of the recesses is such that when the body and cover come together at 45 the cushion and gasket are moderately but not excessively compressed; the gasket is moderately flattened and lengthened. The gasket is thus expanded or spread into the wedge shaped space 46 converging outwardly, which is defined on one side by the sloping surface 36. In service the high pressure fluid within the column outwardly presses the moderately compressed gasket into the outwardly constricting space 46, the outward pressure being in proportion to the pressure provided by the boiler completing and maintaining an effective seal from leakage under the glass.

Figures 2, 3 and 4 illustrate a few of many different commercial forms and as the preceding description can apply equally well to all, with the single exception that in Figure 2 the slot 22 is not a through-slot, the reference numerals applied to corresponding members in the different figures have been made generally the same in all, using distinguishing subscripts only on those few that are relatively distinguished from the common description.

In Figure 2 the body 21', slotted at 22 on one side only needs to be covered on one side only and the glass 34' is provided at 47 with light-refracting serrations to make the water show black and the space above the water light, a commercial feature not in itself part of the present invention.

In Figures 2 and 3 the bolts 43 loosely pass through openings 48 and 49 of the body and of both covers while in Figure 4 stud bolts 43' loosely passing through openings 48 of the cover thread into the body at 48'. Also in Figures 2 and 3 the bore 24 into the lower end of the slot 22 in each case has been located central of the body 21 and slot 22 while in Figure 4 the corresponding bore 24' has been offset toward one side of the body, bored longitudinally through the body for the full length thereof and the body subsequently slotted at 22 somewhat into the bore 24', the offset groove at 50 being intended to guide corrosive condensate away from the mica and glass.

This also in itself is not part of the present invention and is shown merely to illustrate the invention in some only of its many different applications.

In Figure 1 a gasket 38 is shown dotted with its initial section rectangular and in full-line is shown compressed to its position of use with the gasket material then spreading outwardly into a constricted space beyond its initial position. To advantage, it may be made of asbestos, preferably with the asbestos fibers running longitudinally of the perimeter of the gasket.

To secure uniformity of the gasket as ultimately compressed into the constriction space, the gasket throughout its length, should be accurately initially registered laterally of its seat.

When initially registering the gasket of Figure 1 with respect to the slope 36 upon its seat, the gasket 38 is placed upon the upwardly directed seat to lie at uniform distance from the outer edge of the face of the seat, which means that it will be spaced at a uniform distance also from the inner face of the sloping seat, though the spacing from the inner face need not be and usually will not be the same as the spacing from the outer face. The dot-and-dash line showing is that of the initial contour of the gasket. When the cover is fastened in place, the cushion 44 and the gasket 38 are both somewhat compressed, the moderately compressed gasket having spread to considerable extent into the constricted space above the slope 36. When the pressure is applied the high pressure within the column space will further spread and press the gasket outwardly more tightly into the constricted space. This tightens the seal between the glass and the seat.

The initial registry is maintained against accidental disturbance by the aid of paper-thin tabs 51 (Figure 6) suitably formed integral with the gasket. These tabs 51 may be dimensioned to present their outer edges to the wall of the recess 33 when the gasket is registered in its initial right position; they preferably are shellacked on their under side before the gasket is placed in position. They are pressed down to the bottom of the recess 33 after the gasket is put to position, the shellacked tabs sticking to the body and holding the gasket in its set position. Such tabs have been successfully used, having a thickness of the order of one hundredth of an inch and should be of thickness at least less than the intended ultimate clearance between the downwardly presented surface of the mica 37 and the upwardly presented surface of the seat when the cover has been clamped to place.

Less desirably, the tabs 51 may be omitted and shellac may be applied at intervals to the bottom of the gasket to retain it after careful initial placement with respect to the slope 36.

In Figure 7 the gasket is provided with a special molded form, preferably of initial greatest thickness at 52 close to the inner edge or low portion of the slope 36.

In the form of Figure 8, the registering tabs 51' are located at the inner side of the gasket 36 so that they may be extended perpendicularly into the slot 22 of the column, and the gasket and tabs are so dimensioned with respect to the gasket seat as to register the gasket rightly with respect to the slope 36 when the perpendicular tabs engage the walls 53 of slot 22. As before, each tab preferably is coated with a little shellac where it engages the walls 53 in order properly to hold the gasket in its right place with respect to the slope 36.

After thus placing the gasket, the glass 34 and protecting mica 37 are put in place and when the cover is fastened down tightly to the body the gasket under moderate compression spreads to some such contour as that indicated in dotted lines.

It will be understood that in both of the forms of Figures 7 and 8 the tabs for initially registering the gasket to its right position preferably are in number merely enough to perform this service, as for example perhaps three at each end and one or more intermediate the ends on each side of the slot.

In the form of Figure 9, the registration is secured by providing the body with a shoulder 54, the gasket when fitting around the shoulder being uniformly placed throughout its length with respect to the slope 36. The gasket is shown, as before, as having its greatest initial depth near the beginning of the slope 36 and at or near the line of initial engagement with the glass.

In the form of Figure 9, the slope 36 extends part way only to the shoulder 54. There may be some advantage however in extending the slope all the way to the shoulder as illustrated in the slope 36' of Figure 10 in that the vertical area of the gasket directly exposed to the fluid pressure from the interior of the column 24 may be then greater than in the arrangement of Figure 9 where the inner edge at 55 of the compressed gasket may be so tightly in contact with the outer edge of the shoulder 54 as to prevent or lessen outward pressure of the fluid at points downwardly beyond the top of the shoulder.

It will be understood that in both the form of Figure 9 and that of Figure 10, the shoulder 54 may be dispensed with, registry then being obtained by more careful placement of the gasket, preferably then coating the bottom of the gasket, for a portion at least of its width, as that at 55 toward the water column, with shellac or the like and pressing the gasket down after it has been positioned rightly to make it stay in place when clamping down the glass and cover. This is advantageous from the standpoint of lessening the cost of machining the seat for the gasket, but less advantageous from the standpoint that correct assemblage then takes greater care and more time than with the use of tabs or of a shoulder.

The gaskets shown in Figures 1 to 10 have been indicated as non-metallic, suitably made of sheet material including an asbestos base or, when specially molded, molded with the fibers generally longitudinal of the peripheral length of the gasket. The gaskets are also advantageously made of a metal or alloy such as copper, bronze, zinc alloys, lead alloys, alloys of aluminum and aluminum. The metal gaskets may be stamped or pressed from sheet or formed from strip material such as wire. Aluminum is particularly suited as a material except from the standpoint that direct contact between aluminum and the hot water and steam within the column is undesirable in that aluminum is attacked by high pressure hot water and steam, particularly by hot softened water which is usually alkaline. This objection to aluminum may be overcome by plating the gasket with a corrosion resistant metal such as copper or cadmium.

In Figures 11 and 12, I show a form of metal gasket 56 that I have found well adapted to securing a proper seal between the glass and its seat. The gasket comprises a sectionally round metal wire made endless by welding the ends together. Registry is secured by outwardly-extending small wires 57 which are welded at 58 to the body of the gasket wire and at their outer ends 59 are turned up to lie in the clearance space 60 between the glass 34 and the inside wall of the recess 33. The registry wires 57 suitably are very thin. Preferably the gasket wire 56 initially registers with its lower side tangential both to the slope 36 and to the horizontal portion 61 of the seat. The dotted line is intended to indicate the approximate contour of the initially round gasket after moderate compression due to bolting down the cover. The full depth of the compressed wire is exposed to the fluid pressure from the column, which pressure presses the gasket more tightly into the constriction space outwardly along the slope 36, thus maintaining effective seal under the glass.

Figure 13:
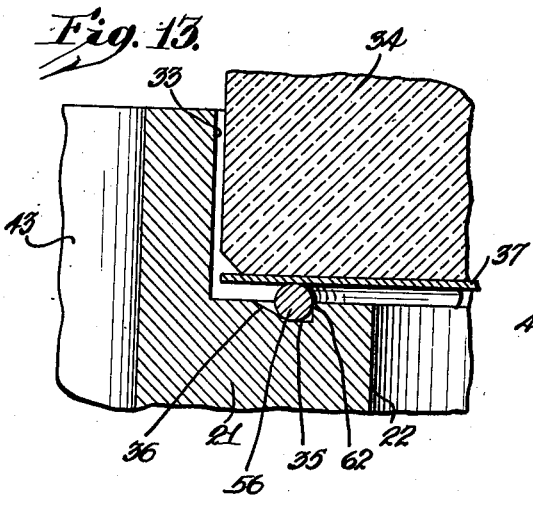

Figure 13 illustrates that the initial registry may be secured by a shoulder 62 around the slot 22 and at the inner side of the initial position of the gasket wire.

Figure 14:
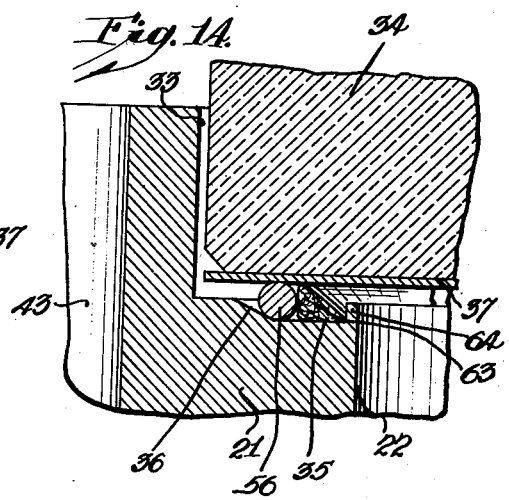
Figure 15:
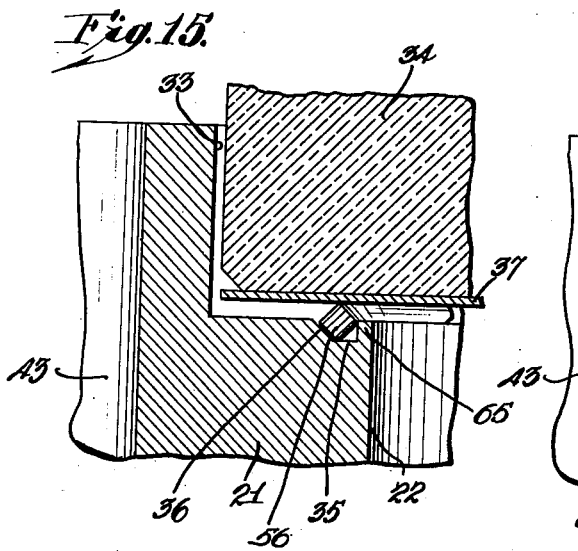

Figure 14 illustrates that the gasket wire 56 may be protected from direct contact with the water and steam within the column 22. As there shown a gasket member 63, suitably of asbestos base, is positioned to register the metal wire gasket 56 rightly with respect to the slope 36. As shown the fiber gasket 63 is itself registered by an inner shoulder 64.

It will be obvious that the registering shoulder may be dispensed with and that the metallic gaskets may be registered initially by means of the same character as is used for non-metallic gaskets such for example as the registering tabs of Figure 8 or the use of shellac as discussed in connection with other figures.

While I have found the initially round section gaskets of Figures 11, 13 and 14 particularly suitable to effectively sealing with the glass by compressing into the constriction space, I may use a different initial contour. For example, in Figure 15 I show a metal wire that initially is of generally square section with preferably very slightly rounded corners. The long diameter of the square section is presented initially to the glass and the gasket member itself is initially registered by the shoulder 65 as in the case of the non-metallic packing illustrated in Figures 9 and 10.

Figure 16:
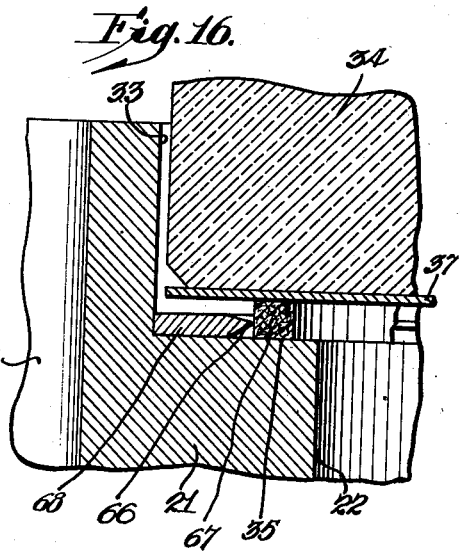

I prefer to obtain the constriction space by a single slope 36, as in all of the forms thus far described, but may provide a double slope as indicated in Figure 16. In this figure a gasket 67 of rectangular section and suitably of asbestos base is registered with its outer side against the edge at 66 of the two slopes formed on the inner edge of a metallic gasket 68. The gasket 67 may be secured initially by shellacking its under surface prior to placing the glass and cover. When the cover has been put on and the glass has been pressed down the gasket is spread laterally with the material flowing somewhat up along both slopes.

It will be understood that in all of the forms described I have provided a constriction space beyond the gasket prior to fastening the cover to place. When the cover is fastened down, in each case tight to the body, the material of the gasket in each case flows up the slope and makes an effective seal with the glass. It will be understood that the force of compression upon the glass is in each case limited by the coming together of the body and cover at the line 45 and that the materials and dimensions are so selected that this force is always too small to endanger the glass. However, it secures a substantial compression and lateral spreading of the gasket whether metal or fiber and after such compression the gasket itself is maintained tight by the high pressure within the column which pressure tends to force the gasket further into the constriction space and to do so uniformly all around the seat, thereby avoiding any great difference in the force upon the glass at different points around the gasket.

In view of my invention and disclosure, variations and modifications to meet individual whim or particular need will doubtless become evident to others skilled in the art to obtain part or all of the benefits of my invention without copying the structure shown and I therefore claim all such in so far as they fall within the reasonable spirit and scope of my invention.

Having thus described my invention, what I claim as new and desire to secure by Letters Patent is:

1. In a water gauge, a body having a slot to disclose a water column within the body, a gasket seat around the slot, a gasket on the seat, a glass having a flat face presented to the gasket, the said seat throughout its perimetral length sloping outwardly toward the glass and a cover having a slot adapted to disclose the water column through the glass and the body slot, having face to face engagement with the body and supporting the glass in a position to press the glass upon the gasket, thereby moderately compressing the gasket and spreading the gasket laterally somewhat up the slope, whereby fluid pressure within the column presses the gasket outwardly into the outwardly constricting space at the slope to tighten the gasket seal between the glass and the body and the face to face engagement of the cover and body limits and determines the initial compression of the glass upon the gasket.

2. In a water gauge, a body having a slot to expose a water column within the body, a cover having a slot to disclose the slot in the body and the body and cover having complementary recesses to together hold a flat glass, the glass to extend into both recesses with the combined depth of the recesses greater than the thickness of the glass, a gasket seat within the body recess around the body slot, a gasket extending longitudinally of the seat, a glass having a flat face presented to the gasket and enclosed by the complementary recesses, the said seat throughout its perimetral length sloping outwardly toward the glass and means clamping the cover face to face to the body to support the glass in position to press the glass upon the gasket thereby moderately compressing the gasket, spreading the gasket laterally outwardly somewhat up the slope whereby fluid pressure within the column presses the gasket outwardly into the outwardly constricting space at the slope for a tighter gasket seal and whereby the face to face engagement of the cover and body limits and determines the initial engagement of the cover and glass upon the gasket.

3. In a water gauge, a body having a slot to expose a water column within the body, a gasket seat around the slot, an endless gasket of wire on the seat and adapted to be distorted by lateral glass pressure, a glass on the gasket, the said seat throughout its perimetral length sloping outwardly toward the glass and a cover having face to face engagement with the body, the cover slotted in front of the body slot to disclose the water column through the glass and supporting the glass in position to press the glass upon the gasket thereby moderately laterally distorting the gasket, spreading the gasket laterally outwardly somewhat up the slope whereby fluid pressure within the column presses the gasket outwardly into the outwardly constricting space at the slope to secure a tighter gasket seal and whereby the face to face engagement between the cover and body limits and determines the initial compression of the glass upon the wire gasket.

4. In a water gauge, a body having a recess to receive a glass and a slot to expose a water column within the body, a gasket seat within the recess and about the perimeter of the slot, a gasket on the seat, a glass on the gasket smaller than the recess to give room between the edge of the glass and the recess wall, the said seat throughout its perimetral length sloping outwardly toward the glass, means supporting the glass in a position to press the glass upon the gasket, thereby moderately compressing the gasket, spreading the gasket laterally somewhat up the slope whereby fluid pressure within the column presses the gasket outwardly into the outwardly constricting space at the slope for a tighter gasket seal between the glass and the body and thin tabs on the gasket located at intervals along the length of the slot and gasket spacing the gasket from an adjacent wall of the recess and effective to register the gasket with respect to the slope.

5. In a water gauge, a body having a slot to expose a water column within the body, a gasket seat around the slot, a gasket on the seat, an outwardly directed upwardly extending perimetral shoulder between the slot and gasket registering the gasket surrounding the shoulder with respect to the seat, a glass on the gasket, the said seat throughout its length sloping outwardly toward the glass and a cover having a recess in which to receive the glass and a slot to expose the water column through the glass and the said body slot, having face to face engagement with the body and supporting the glass in position to press the glass upon the gasket, thereby moderately compressing the gasket and spreading it laterally somewhat up the slope, whereby fluid pressure within the column presses the gasket outwardly into the outwardly constricting space at the slope for a tighter gasket seal between the glass and body and whereby the initial compression of the gasket by the glass is limited by the face to face engagement between the cover and body.

6. In a water gauge, a body having a slot to disclose a water column within the body, a gasket seat around the slot, an endless metallic gasket on the seat, a non-metallic gasket inwardly adjacent the metallic gasket, an outwardly directed upwardly extending perimetral shoulder between the slot and non-metallic gasket registering the gaskets with respect to the seat, a glass on the gaskets, the said seat throughout its perimetral length sloping outwardly toward the glass and a cover having a recess in which to receive the glass and a slot to expose the water column through the glass and the said body slot, having face to face engagement with the body and supporting the glass in position to press the glass upon both gaskets thereby moderately compressing the non-metallic gasket, spreading the metallic gasket laterally outwardly somewhat up the slope whereby fluid pressure within the column presses the gaskets outwardly and the non-metallic gasket shields the metallic gasket from the water and steam of the column and whereby the initial compression of the gaskets are determined and limited by the face to face engagement between the cover and body.

7. In a water gauge a body slotted to disclose a water column within the slot, cut away about the slot to provide room for a sight glass and having a gasket seat within the cut away part sloping away from the slot and toward the face of the cut away part, a plane sight glass thereover, a gasket between the gasket seat and the adjoining plane of the glass adapted to stand the temperature of high pressure steam and having high plasticity, a cover for the body slotted in line with the slotting of the body and bolts retaining the cover in position, the cover engaging the adjacent body, when in place both outside the line of bolts and between the line of bolts and the slot in the cover.

WALTER J. KINDERMAN.